United States Patent [19]
Wolf

[11] 3,840,379
[45] Oct. 8, 1974

[54] GLASS COMPOSITIONS
[75] Inventor: Warren W. Wolf, Columbus, Ohio
[73] Assignee: Owens-Corning Fiberglas Corporation, Toledo, Ohio
[22] Filed: July 27, 1972
[21] Appl. No.: 275,613

[52] U.S. Cl............... 106/50, 106/52, 106/99, 161/170
[51] Int. Cl................ C03c 13/00, C04b 31/06
[58] Field of Search................ 106/50, 52, 99

[56] References Cited
UNITED STATES PATENTS
3,783,092  1/1974  Majumdar..................... 106/50

OTHER PUBLICATIONS
Kirk-Othmer, (1963), Encyclopedia of Chemical Technology - Vol. 22, p. 653.

Primary Examiner—Helen M. McCarthy
Attorney, Agent, or Firm—Carl G. Staelin; John W. Overman; Patrick P. Pacella

[57] ABSTRACT

Alkali resistant, fiberizable glass compositions are disclosed. The compositions have the following range of proportions by weight: $SiO_2$, 60 to 62%; $CaO$, 4 to 6%; $Na_2O$, 14 to 15%; $K_2O$, 2 to 3%; $ZrO_2$, 10 to 11% and $TiO_2$, 5.5 to 8%.

9 Claims, No Drawings

GLASS COMPOSITIONS

BACKGROUND OF THE INVENTION

This invention concerns fiberizable glass compositions and glass fibers which are alkali resistant.

Until quite recently it has not been advisable to use glass fibers for long term (5 or more years) reinforcement of cement, concrete, mortar or other cementitious materials or matrices that have a high alkali content. The harsh alkali environment would degrade the types of glass fibers, E glass for example, commonly used to reinforce non-alkali materials such as plastics.

E glass fibers are not generally recommended for the long term reinforcement of Portland cement or other cementitious products. The alkali content of the cementitious matrix attacks the E glass fiber surface and substantially weakens the fibers. This alkali attack and subsequent fiber strength loss generally so weakens the fibers that long term reinforcement of the matrix by the E glass fibers is neither predictable nor dependable.

To remedy this situation the prior art has tried a number of potential solutions. One is to coat the fibers with some material that is alkali resistant. Epoxy resin coated fibers, for example, generally will withstand alkali attack. The coat of the resin and the processing necessary to put it on the fibers however often makes this solution too expensive for commercial use. Another potential solution is to use a high alumina cement which has less alkali content.

An ideal solution however is to formulate a glass composition which in fiber form will be resistant to alkali attack. This approach eliminates the need to specially treat the glass fibers with an alkali resistant coating. And it does not require special cement batches.

An alkali resistant glass composition is described in British Patent Specification No. 1,243,973 filed Aug. 4, 1967 and published on Aug. 25, 1971 with A. J. Majumdar named as inventor. The British Majumdar patent specification describes alkali resistant glass compositions which can be drawn into glass fibers and have the following range of proportions by weight: $SiO_2$, 65 to 80%; $ZrO_2$, 10 to 20% and 10 to 20% of a network modifier which is an alkali metal oxide, an alkaline earth metal oxide or zinc oxide. In addition these glasses can contain minor amounts of $Al_2O_3$ substituted for $SiO_2$ and fluxing agents which are not also network modifiers up to about 10%.

Another alkali resistant glass composition is disclosed in U.S. Pat. No. 3,499,776, issued on Mar. 10, 1970. It describes a bulk glass composition, which may or may not be fiberizable, and that consists essentially of, in mole percent: $SiO_2$, 72 to 85%; $B_2O_3$, 4 to 12%; $ZrO_2$, 1 to 6% and $Na_2O$ and/or $K_2O$, 2.5 to 7%.

In attempting to use the British Majumdar glass compositions in commercial production equipment used to fiberize E glass some serious problems are encountered because the glasses have a very high melting temperature. This means that the temperatures of commercial furnaces (like those used to melt E glass) would have to be in excess of 3,000°F. Commercial E glass fiber manufacturing facilities maintain furnace melting temperatures at about 2,650° to 2,750°F. The significantly higher temperatures required to melt the British Majumdar glasses makes them very expensive to run in commercial equipment. In addition to more fuel being required to operate at these higher temperatures, furnace life is reduced because of the increased deterioration of refractories at these higher temperatures.

Alkali resistant, fiberizable glass compositions are described in Dutch patent application number 70.11037 published in the Netherlands on July 24, 1970 and corresponding to British patent application No. 37,862 (provisional specification filed July 28, 1969 and complete specification filed July 21, 1970) assigned to Pilkington Brothers Limited.

The British Pilkington specifications disclose the following alkali resistant glass composition, in molecular percentages: $SiO_2$, 62 to 75%; $ZrO_2$, 7 to 11%; $R_2O$, 13 to 23%; RO, 1 to 10%; $Al_2O_3$, 0 to 4%; $B_2O_3$, 0 to 6%; $Fe_2O_3$, 0 to 5%; $CaF_2$, 0 to 2% and $TiO_2$, 0 to 4%. The application states that glasses falling within this range of ingredients will have a maximum viscosity of $10^{-3}$ poises at 2,408°F and a liquidus temperature of more than 104°F below a maximum working temperature of 2,408°F.

To be fiberized at the most economical commercial production rates a glass composition ideally should have properties similar to E glass. E glass has a melting temperature of about 2,650° to 2,750°F and a fiberizing temperature of 2,250° to 2,500°F. In addition these glasses should have a viscosity and liquidus similar to commercial E glass, that is a viscosity of $10^{2.50}$ poises at about 2,360° to 2,380°F and $10^3$ poises at about 2,200° to 2,220°F. They should have a liquidus temperature of about 2,000°F or less. Ideally an alkali resistant glass composition would have properties similar to these.

SUMMARY OF THE INVENTION

Fiberizable glass compositions which are resistant to alkali attack have been discovered. The glass compositions and glass fibers made from them fall within the following range of proportions:

| Ingredient | Weight Percent | Mole Percent |
|---|---|---|
| $SiO_2$ | 60 to 62 | 65 to 67 |
| CaO | 4 to 6 | 4.5 to 6.5 |
| $Na_2O$ | 14 to 15 | 14.5 to 16 |
| $K_2O$ | 2 to 3 | 1 to 2.5 |
| $ZrO_2$ | 10 to 11 | 5 to 6 |
| $TiO_2$ | 5.5 to 8 | 4.5 to 6.5 |

Glass compositions falling within this range of proportions can be melted at 2,650° to 2,750°F and can be fiberized at 2,250° to 2,500°F. In addition these glasses will have a viscosity of $10^{2.50}$ poises at 2,400°F or less and $10^3$ poises at 2,220°F or less. They have a liquidus temperature of 1,500°F or less.

Glass compositions falling within the above ranges can be drawn into continuous fibers having a diameter of about $15 \times 10^{-5}$ to $100 \times 10^{-5}$ inches. No crystallization takes place after maintaining a supply of the glass at 1,500° to 2,500°F for 64 hours. Therefore liquidus is either below 1,500°F or occurs so slowly that it is insignificant from a commercial standpoint.

The unique combination of alkali resistance, low liquidus temperature and favorable forming temperature — viscosity relationship makes the glasses of this invention particularly suitable for commercial production and reinforcement of cementitious matrices including cement, concrete, mortar, hydrous calcium silicates and the like.

DESCRIPTION OF THE INVENTION

The glass compositions of this invention fall within the following range of proportions:

| Ingredient | Weight percent | Mole Percent |
|---|---|---|
| $SiO_2$ | 60 to 62 | 65 to 67 |
| CaO | 4 to 6 | 4.5 to 6.5 |
| $Na_2O$ | 14 to 15 | 14.5 to 16 |
| $K_2O$ | 2 to 3 | 1 to 2.5 |
| $ZrO_2$ | 10 to 11 | 5 to 6 |
| $TiO_2$ | 5.5 to 8 | 4.5 to 6.5 |

It has been discovered that glass compositions falling within this range of proportions can be formed into fibers using commercial E glass melting and fiber forming techniques and at commercial E glass production rates. Also it has been found that glasses of this type will have a liquidus temperature so low, less than 1,500°F, that devitrification of the molten glass prior to or during fiber forming can be ignored. This is a significant processing advantage in that devitrification can lead to costly and time consuming production shut downs.

As previously discussed, the prior art has developed alkali resistant glass compositions. Some of the best ones developed to date contain $ZrO_2$. The compositions of this invention contain $ZrO_2$ in combination with $TiO_2$. Both $ZrO_2$ and $TiO_2$ are believed to impart alkali resistance to the glass compositions. Exactly how they do this is not presently known.

The glass compositions of this invention are somewhat similar in composition to the glass compositions disclosed in British Pilkington patent application No. 37,862. The glasses of this invention however depart from the Pilkington application by using less $ZrO_2$ and more $TiO_2$. The glasses of this invention have, on a molecular basis, 5 to 6% $ZrO_2$ and 4.5 to 6.5% $TiO_2$ while the British Pilkington application discloses a low $ZrO_2$ level of 7% and high $TiO_2$ level of 4%.

The differences between the compositions of this invention and those of the British Pilkington application seem at first quite small. However it has been discovered that a small departure from the Pilkington composition causes an unexpected and major difference, of highly significant commercial value, in the liquidus temperature and therefore liquidus-viscosity temperature relationship of the glasses of this invention. The liquidus temperature of the glasses of this invention is less than 1,500°F. It is much less than any of the liquidus temperatures given in or reasonably anticipated by the British Pilkington application. The extremely low liquidus makes the glasses of this invention very suitable for commercial production for the following reason. Commercial fiber forming processes are geared to melt the glass compositions at about 2,650° to 2,750°F and fiberize it at about 2,250° to 2,500°F. To avoid devitrification of the molten glass in the melting or fiberizing zone it is important that the liquidus or devitrification temperature of a glass be at least 50°F, and preferably 100°F or more, below the usual fiberizing temperature. With a liquidus of less than 1,500°F, the glasses of this invention are at least 700°F below the danger level. The difference between the liquidus of the glass and the operating temperatures is so great that devitrification or crystal growth can be ignored. Avoidance of crystals is important because crystals in the glass can cause fiber breakage and production shut downs. Using the glasses of this invention problems are virtually eliminated.

The other key property of smooth running, commercial, fiber forming glasses is viscosity. Viscosities of $10^{2.50}$ poises at temperatures of 2,450°F or less and $10^3$ poises of 2,220°F or less are most desirable. The glass compositions of this invention easily meet this requirement. Usually the viscosity at which fibers can be drawn is limited by the liquidus of the glass. Since in the glasses of this invention the liquidus is so low it can be ignored, the only limitation as far as fiber drawing or forming temperature is concerned is the tension of the molten glass. As viscosity increases with decreasing temperature, tension increases. The tension will, at too low of a temperature, become so great that the fiber will break instead of attenuating.

Specific glass compositions embodying the principles of this invention are set forth in the following Examples 1 and 2.

Example 1

| Ingredient | Weight Percent | Mole Percent |
|---|---|---|
| $SiO_2$ | 61.1 | 66.6 |
| CaO | 5.1 | 6.0 |
| $Na_2O$ | 14.4 | 15.2 |
| $K_2O$ | 2.6 | 1.8 |
| $ZrO_2$ | 10.4 | 5.5 |
| $TiO_2$ | 6.0 | 4.9 |
| $Al_2O_3$ | 0.3 | — |
| $Fe_2O_3$ | 0.2 | — |

Liquidus temperature: No devitrification was found after 64 hours over a temperature range of 1,500° to 2,500°F.

Viscosity

| Log Poise | Temperature, °F |
|---|---|
| 1.75 | 2735 |
| 2.00 | 2590 |
| 2.25 | 2467 |
| 2.50 | 2362 |
| 2.75 | 2273 |
| 3.00 | 2188 |

Example 2

| Ingredient | Weight Percent | Mole Percent |
|---|---|---|
| $SiO_2$ | 60.8 | 66.6 |
| CaO | 4.2 | 4.9 |
| $Na_2O$ | 14.3 | 15.2 |
| $K_2O$ | 2.6 | 1.8 |
| $ZrO_2$ | 10.4 | 5.6 |
| $TiO_2$ | 7.3 | 6 |
| $Al_2O_3$ | 0.3 | — |
| $Fe_2O_3$ | 0.2 | — |

Liquidus temperature: No devitrification was found after 64 hours over a temperature range of 1,500° to 2,500°F.

Viscosity

| Log Poise | Temperature, °F |
|---|---|
| 1.75 | 2700 |
| 2.00 | 2567 |
| 2.25 | 2447 |
| 2.50 | 2350 |

Viscosity-Continued

| Log Poise | Temperature, °F |
|---|---|
| 2.75 | 2260 |
| 3.00 | 2180 |

The viscosity determinations in Examples 1 and 2 were obtained using the apparatus and procedure described in U.S. Pat. No. 3,056,283 and in an article in *The Journal of the American Ceramic Society*, Vol. 42, No. 11, November, 1959, pages 537–541. The article is entitled "Improved Apparatus for Rapid Measurement of Viscosity of Glass at High Temperatures" by Ralph L. Tiede. Other specific viscosity determinations referred to herein also would be measured by the apparatus and procedure in the Tiede article.

In the glass compositions of this invention $SiO_2$ is the primary glass forming ingredient. The alkali metal oxides $Na_2O$ and $K_2O$ are used to control viscosity. CaO is used primarily to control liquidus. It does this without adversely affecting the viscosity.

$ZrO_2$ and $TiO_2$ are the two ingredients believed to be responsible for the alkali resistance of these glasses.

$Fe_2O_3$ and $Al_2O_3$ can enter these glass compositions as impurities of the batch raw materials. Preferably $Fe_2O_3$ should be maintained below about 0.5% by weight and $Al_2O_3$ should be maintained below about 1% by weight.

Tables 1 and 2 record the tensile strength retention of glass fiber strands of the following glass compositions, in percent by weight:

| Ingredient | E Glass | Glass 1 | Glass 2 | Glass 3 |
|---|---|---|---|---|
| $SiO_2$ | 54.6 | 66.0 | 62.2 | 61.1 |
| $Al_2O_3$ | 14.5 | 4.6 | — | — |
| CaO | 18.0 | — | 1.7 | 5.1 |
| MgO | 4.0 | — | — | — |
| $B_2O_3$ | 6.9 | — | — | — |
| $Na_2O$ | 0.4 | 11.5 | 14.4 | 14.4 |
| $K_2O$ | — | — | — | 2.6 |
| $Li_2O$ | — | 1 | 0.9 | — |
| $TiO_2$ | 0.6 | — | 2.4 | 6.0 |
| $ZrO_2$ | — | 16.4 | 18.5 | 10.4 |
| $F_2$ | 0.6 | — | — | — |
| $Fe_2O_3$ | 0.4 | — | — | — |

Glass 1 is an alkali resistant glass composition falling within the range of British Patent Specification No. 1,243,973. Glass 2 is an alkali resistant glass composition falling within the range of British Patent Application No. 37,862. It is Glass No. 55, listed at page 5 of the complete specification of British patent application No. 37,862. Glass 3 is the alkali resistant glass composition of Example 1 of this application.

E glass is a textile glass composition used for many years for the reinforcement of non-alkali matrices such as plastics. It is well known for its properties which allow it to be easily and economically fiberized in commercial quantities and at commercial rates using direct melt furnaces and fiberizing techniques.

Table 1

| Environment | Tensile Strength Retention of E Glass | | | |
|---|---|---|---|
| | Immersion Time | Solution Temp. | % Strength Retained |
| Air | — | — | 100 |
| Synthetic Cement Solution | 8 hours | 148°F | 78.8 |
| do. | 24 do. | do. | 57.0 |
| do. | 48 do. | do. | 33.3 |
| do. | 96 do. | do. | 28.3 |
| do. | 144 do. | do. | 16.6 |

Table 2

Tensile Strength Retention of Glasses 1, 2 and 3

| Environment | Immersion Time | Solution Temp. | % Strength Retained | | |
|---|---|---|---|---|---|
| | | | Glass 1 | Glass 2 | Glass 3 |
| Air | — | — | 100 | 100 | 100 |
| Synthetic Cement Solution | 1 week | 148°F | 81.2 | 67.8 | 68.0 |
| do. | 2 do. | do. | 73.5 | 55.0 | 83.5 |
| do. | 3 do. | do. | 71.2 | 59.6 | 68.4 |
| do. | 4 do. | do. | 53.0 | 60.3 | 57.7 |

The procedure for obtaining the strength retention values of Tables 1 and 2 was essentially as follows. Each of the glass compositions was fiberized and coated with the same forming size. Fiber diameter was maintained in the range of 50 to 55 hundred thousandths of an inch. All strands except those of Glass 3 had 52 filaments. Glass 3 strands had 204 filaments.

Strands of each glass were wound around and suspended between brass pegs spaced about 1 foot apart. These pegs and strands were then immersed in a synthetic cement solution having a pH of 12.4 to 12.5 and comprising an aqueous solution of 0.88 grams/liter of NaOH, 3.45 grams/liter of KOH and 0.48 grams/liter of $Ca(OH)_2$. This cement solution is described in British Majumdar patent specification No. 1,243,973 and in an article by A. J. Majumdar and J. F. Ryder entitled "Glass Fibre Reinforcement of Cement Products" appearing at pages 78–84 of *Glass Technology*, Vol. 9 (3), June, 1968.

Polypropylene pans containing the solutions and immersed samples were covered and placed in ovens maintained at a temperature of 148°F for the indicated periods of time.

At the end each time period, for example 1 week, the samples were removed from the cement solution, rinsed in tap water and dried in air. The samples in Tables 1 and 2 tested in an "air" environment were not immersed in the cement solution but exposed only to air, rinsed in tap water and dried in air.

Glasses 1 and 3 were immersed adjacent one another in the same pan. The E glass and Glass 2 samples were neither immersed in the same pan nor with Glasses 1 or 3.

After air drying of the samples their tensile strength was measured on a floor model Instron Universal testing machine, Model TTC, Ser. No. 1680 at a gage length of 2.0 inches and a strain rate of 0.1 inch/inch/minute. For each time interval at least twenty strands of each glass were broken. The percentage of the strength retained by each glass in Tables 1 and 2 therefore represents an average of at least 20 tensile strength readings.

Comparing the strength of E glass with the strengths of Glasses 1, 2 and 3 clearly shows the superior alkali resistance of the Table 2 glasses.

A comparison of Glasses 1, 2 and 3 shows that Glass 3, a glass embodying the principles of this invention, has alkali resistance comparable to that of Glasses 1 and 2. This high degree of alkali resistance combined with the favorable fiberizing and liquidus temperatures, and liquidus-viscosity relationship of the glasses of this invention make them highly desirable. Their fiber forming characteristics make them as easy to work with as E glass, while their alkali resistance makes them suitable for reinforcing cementitious matrices.

Glass fibers of the composition of Example 1 of this invention have been used successfully as a reinforcing material in hydrous calcium silicate insulation having a density of 10 to 20 pounds per cubic foot. The fibers comprised up to 10% by weight of the product while other product constituents comprised: 60 to 95% by weight reactive CaO and $SiO_2$ in a ratio of from 0.75 to 1.05, up to 20% by weight cellulose fibers, and the remainder of the weight of the product comprising fillers and other minor components. The glass fibers in these products had a diameter of less than 0.001 inch and were chopped to a length of from 0.25 to 2.0 inches.

These products were formed by indurating and drying aqueous slurries of the product components in a heated, pressurized autoclave. During autoclaving, temperatures as high as 500°F and pressures of 100 to 250 psi were employed. The fibers of this invention survived these high temperatures and pressures as well as the alkali environment of the slurry and were effective as reinforcing materials.

Glass fibers embodying the principles of this invention also have been incorporated in other kinds of cementitious products or matrices including cement, concrete and mortar. These fibers have resisted alkali attack and reinforced the products. Cementitious products also have been made which are reinforced with glass fibers of this invention in combination with other reinforcing materials such as asbestos fibers or wood fibers.

Modifications and variations within the scope of the attached claims are intended to be included.

I claim:

1. Fiberizable, alkali-resistant, glass compositions consisting essentially by weight of:

| | Percent |
|---|---|
| $SiO_2$ | 60 to 62 |
| CaO | 4 to 6 |
| $Na_2O$ | 14 to 15 |
| $K_2O$ | 2 to 3 |
| $ZrO_2$ | 10 to 11 |
| $TiO_2$ | 5.5 to 8 | said compositions having a liquidus temperature of less than 1500°F and a viscosity of $10^{2.50}$ poises at 2380°F or less and $10^3$ poises at 2220°F or less.

2. Alkali resistant glass fibers consisting essentially by weight of:

| | Percent |
|---|---|
| $SiO_2$ | 60 to 62 |
| CaO | 4 to 6 |
| $Na_2O$ | 14 to 15 |
| $K_2O$ | 2 to 3 |
| $ZrO_2$ | 10 to 11 |
| $TiO_2$ | 5.5 to 8 |

3. Alkali resistant glass fibers consisting essentially by weight of:

| | Percent |
|---|---|
| $SiO_2$ | 61.1 |
| CaO | 5.1 |
| $Na_2O$ | 14.4 |
| $K_2O$ | 2.6 |
| $ZrO_2$ | 10.4 |
| $TiO_2$ | .6 |

4. Alkali resistant glass fibers consisting essentially by weight of:

| | Percent |
|---|---|
| $SiO_2$ | 60.8 |
| CaO | 4.2 |
| $Na_2O$ | 14.3 |
| $K_2O$ | 2.6 |
| $ZrO_2$ | 10.4 |
| $TiO_2$ | 7.3 |

5. A cementitious product comprising a composite of reinforcing materials and a cementitious matrix wherein one of said reinforcing materials comprises glass fibers, said glass fibers consisting essentially by weight of:

| | Percent |
|---|---|
| $SiO_2$ | 60 to 62 |
| CaO | 4 to 6 |
| $Na_2O$ | 14 to 15 |
| $K_2O$ | 2 to 3 |
| $ZrO_2$ | 10 to 11 |
| $TiO_2$ | 5.5 to 8 | wherein said cementitious matrix is hydrous calcium silicate.

6. The cementitious product of claim 5 wherein said cementitious matrix is Portland cement.

7. The cementitious product of claim 5 wherein said product is concrete.

8. The cementitious product of claim 5 wherein said product is cement.

9. The cementitious product of claim 5 wherein said product is mortar.

* * * * *